United States Patent
Simon

(10) Patent No.: US 11,249,618 B2
(45) Date of Patent: Feb. 15, 2022

(54) FLEXIBLE POP-OUT OF EMBEDDED MENU

(71) Applicant: SAP SE, Walldorf (DE)

(72) Inventor: Patrick Simon, Beckingen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/690,215

(22) Filed: Nov. 21, 2019

(65) Prior Publication Data

US 2021/0157458 A1 May 27, 2021

(51) Int. Cl.
*G06F 3/0482* (2013.01)
*G06F 3/0486* (2013.01)

(52) U.S. Cl.
CPC .......... *G06F 3/0482* (2013.01); *G06F 3/0486* (2013.01)

(58) Field of Classification Search
CPC .............................. G06F 3/0482; G06F 3/0486
USPC ....................................................... 715/810
See application file for complete search history.

(56) References Cited

U.S. PATENT DOCUMENTS

| | | | | |
|---|---|---|---|---|
| 4,931,783 A * | 6/1990 | Atkinson | ............... | G06F 3/0482 345/163 |
| 5,883,626 A * | 3/1999 | Glaser | ................... | G06F 40/151 715/788 |
| 6,057,836 A * | 5/2000 | Kavalam | ............... | G06F 3/0481 715/779 |
| 8,181,119 B1 * | 5/2012 | Ording | .................... | G06F 9/451 715/810 |
| 9,720,566 B1 * | 8/2017 | Smyth | .................... | G06F 3/0481 |
| 2002/0070977 A1 * | 6/2002 | Morcos | ................... | G06F 9/451 715/810 |
| 2009/0055770 A1 * | 2/2009 | King | ..................... | G06F 3/0481 715/810 |
| 2013/0067430 A1 * | 3/2013 | Mayer-Ullmann | ....... | G06F 9/44 717/106 |
| 2016/0209991 A1 * | 7/2016 | Stevens | .................. | G06F 3/0484 |
| 2017/0168694 A1 * | 6/2017 | Liu | ........................ | G06F 3/0482 |

OTHER PUBLICATIONS

Solidworks® Premium 2016 x64 Edition SP 3.0, by Dassault Systèmes, available on Apr. 15, 2016. (Year: 2016).*
"User's Guide: GoldSim—Probabilistic Simulation Environment", GoldSim Technology Group LLC, Version 12.1, Jun. 2018 (Year: 2018).*

* cited by examiner

*Primary Examiner* — Reza Nabi
*Assistant Examiner* — Hwei-Min Lu
(74) *Attorney, Agent, or Firm* — Buckley, Maschoff & Talwalkar LLC

(57) ABSTRACT

Provided is a system and method for popping out a menu that is embedded within a user interface. The popped-out menu can be moved independently of a window in the user interface from which the menu is dislodged from and can have it size adjusted. In one example, the method may include displaying a menu with a plurality of selectable actions which are embedded within a user interface window, receiving a predetermined command with respect to the user interface, and in response to receipt of the predetermined command, outputting a pop-out menu that corresponds to the menu embedded within the user interface window, where the pop-out window includes the plurality of selectable actions and is configured to move independently of the user interface window.

20 Claims, 11 Drawing Sheets

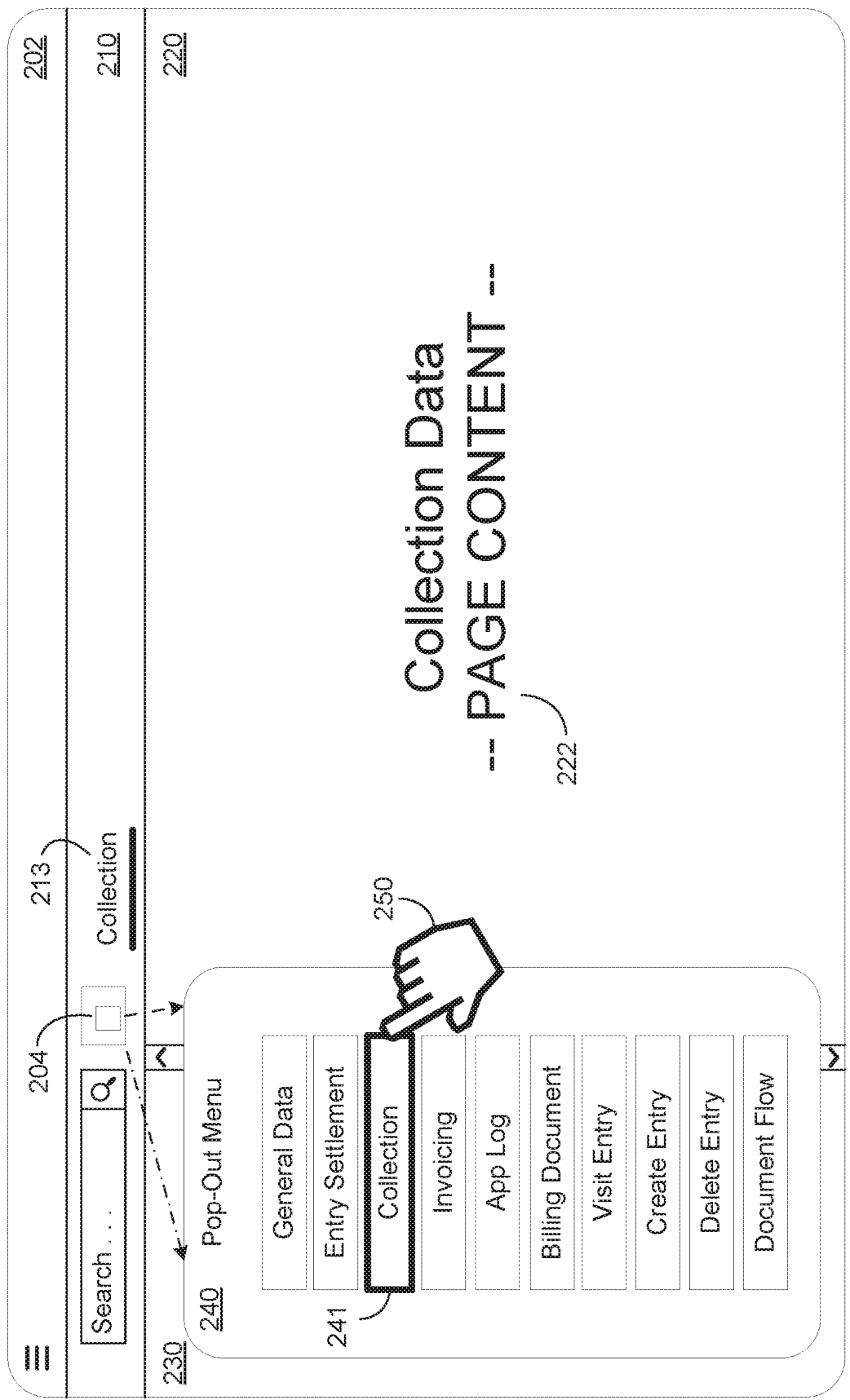

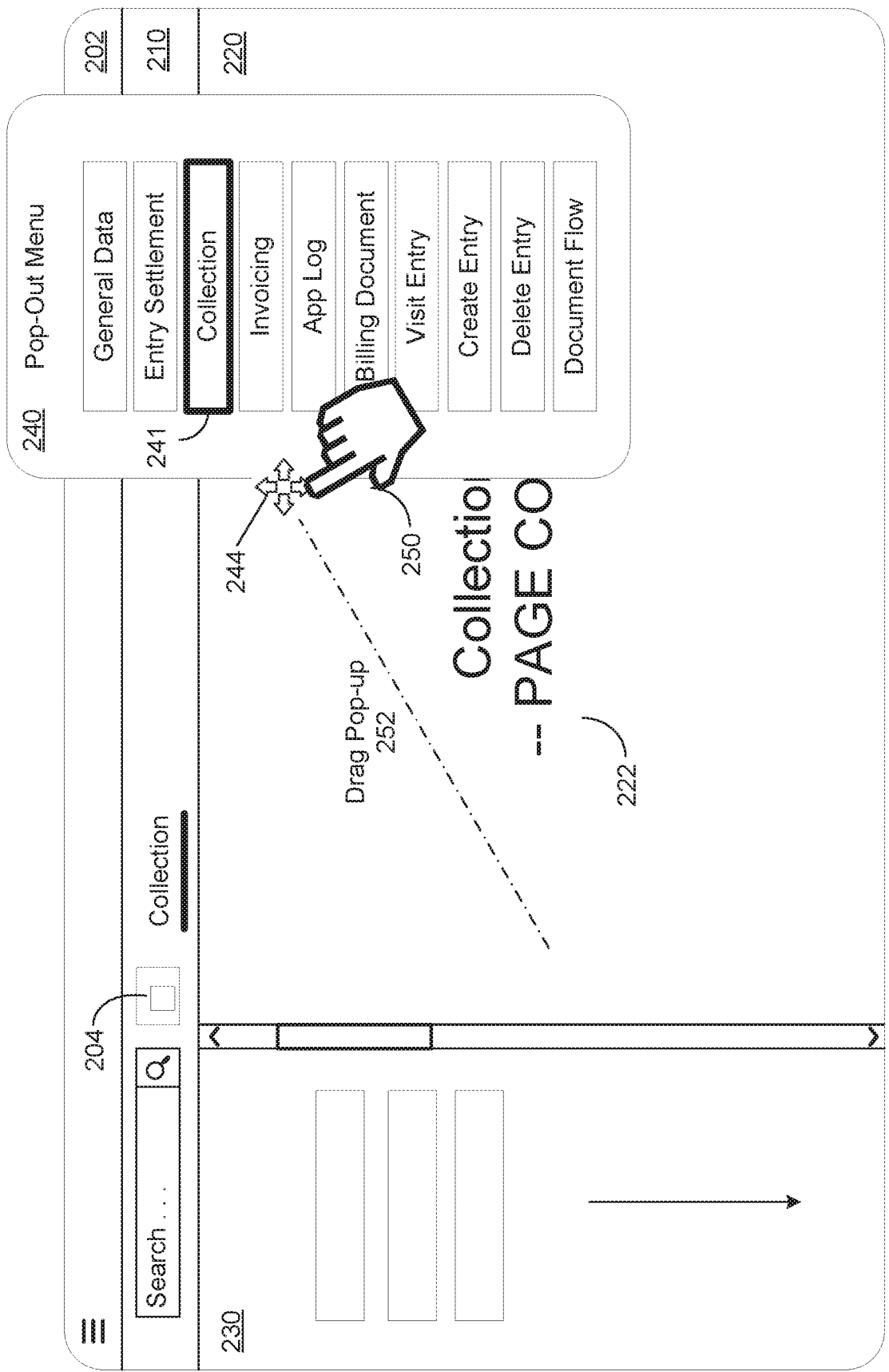

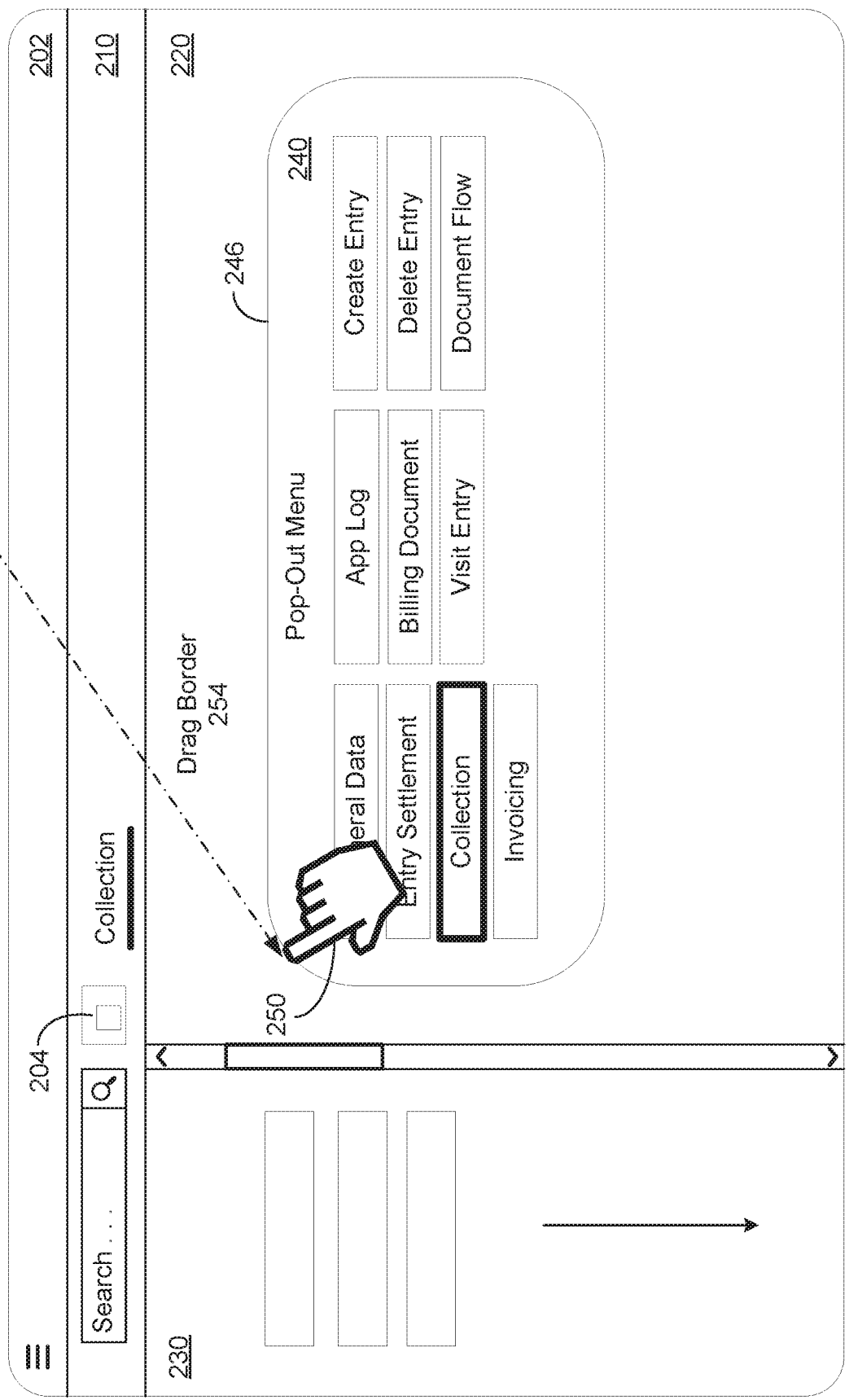

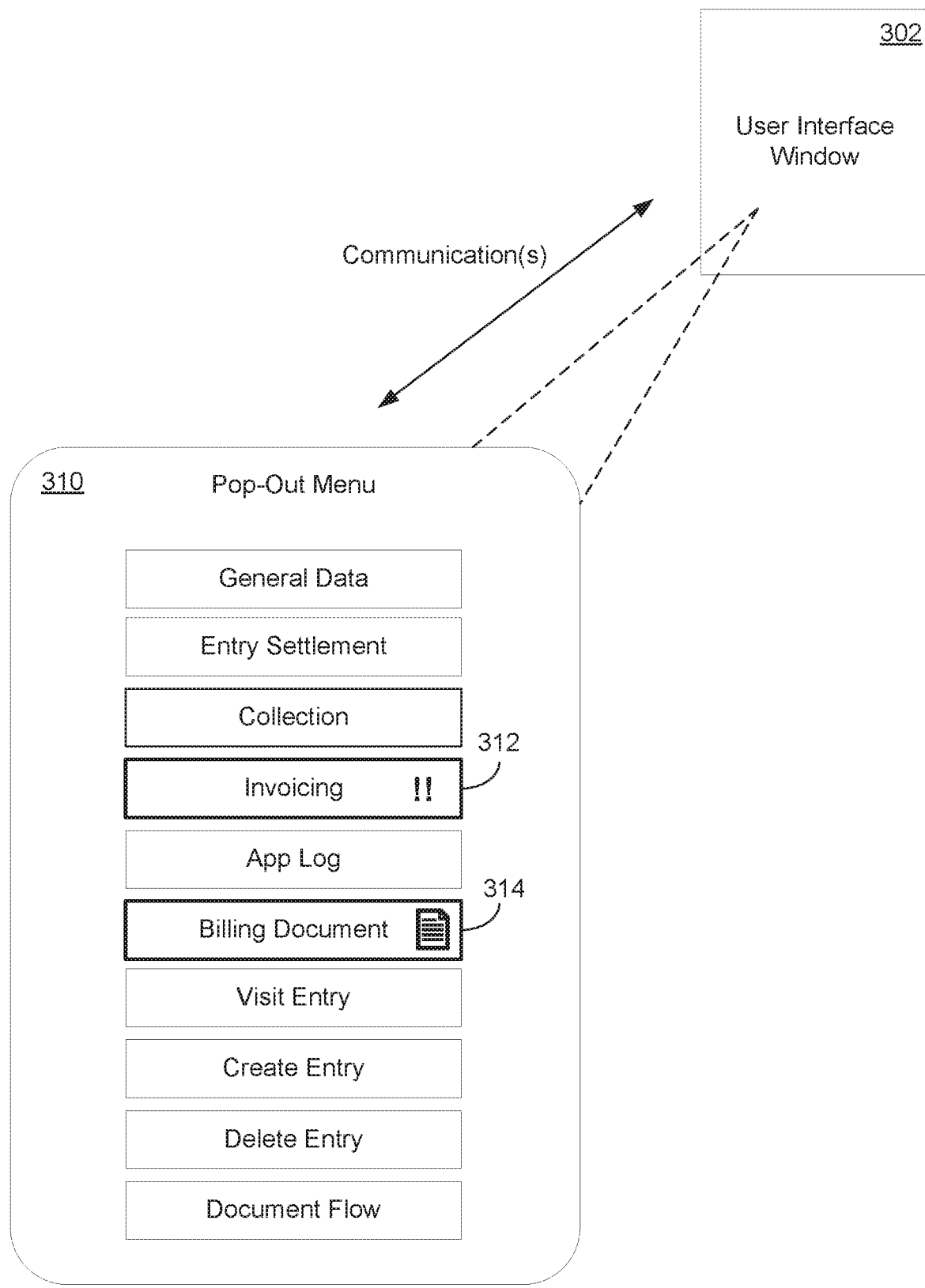

FLEXIBLE POP-OUT OF EMBEDDED MENU

BACKGROUND

A navigation bar (also referred to herein as a navigation menu, navigation panel, navigation tab, etc.) is a user interface element that is typically embedded or otherwise integrated within a webpage or other application that contains links to other sections of a website (or application). In most cases, the navigation bar is part of a main template, which means it is displayed on most or all pages that a user may interact with. Accordingly, the navigation bar can be viewable regardless of the page that is being viewed. A common implementation of the navigation bar is in the form of a horizontal list of links/actions at the top of a page. The links may be positioned below a header of the application and outside of a main content area of the page. In some cases, the navigation bar may be organized vertically on a left side of a page.

The navigation bar allows users to quickly visit multiple sections within the application, at any time. Without a navigation bar, a user may have to repeatedly press a back button to get back to a menu screen. However, larger applications can include many actions within the navigation bar. In many cases, there are too many navigation actions to fit on the screen at the same time. Furthermore, finding the actions (including hidden actions) within the navigation bar can require additional inputs such as scrolling, opening a drop-down menu, or the like.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIGS. 2A-2F are diagrams illustrating processes of controlling a pop-out menu that has been popped out of a user interface in accordance with example embodiments.

FIG. 3A is a diagram illustrating a process of communicating with a pop-out menu in accordance with an example embodiment.

Figure 1:
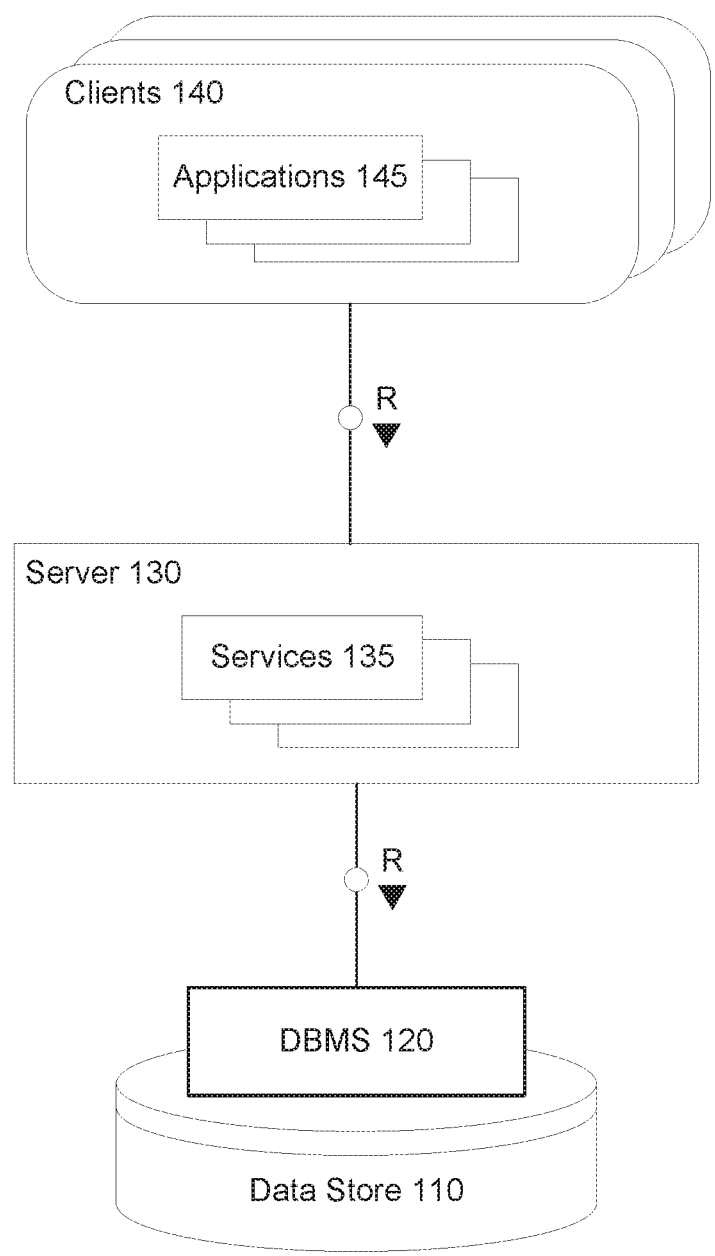
FIG. 1 is a diagram illustrating a database system architecture in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Software applications including native applications, web applications, mobile applications, and the like, can require an extensive number of functions. Often, an application is designed with one or more menus (bar, panel, tab, etc.) for opening different content and navigating to different functions. The menu may be embedded or otherwise integrated within the content template of the application. The menu may provide the user with actions that can be selected to quickly open/navigate to different pages/content of the application. However, the embedded menu may not be able to display all available actions (selectable links) at the same time due to size requirements of the window. This problem is further frustrated due to the reduced screen size of many mobile computing devices which limits the amount of template space for the menu and the actions displayed therein.

The example embodiments overcome the drawbacks of traditional embedded menus through the use of a pop-out menu which can pop-out of a window of an application. For example, a menu that is embedded within a window of the application may include a pop-out icon or button. When the icon or button is selected, the application may activate the pop-out menu and pop-out the embedded menu from the application's window. Here, the pop-out menu may appear like a pop-up window which includes the actions of the embedded menu. In other words, the pop-out menu corresponds to the embedded menu but is no longer embedded within the application window. The pop-out menu can replace the embedded menu and can move independently of the window from which it pops out from. For example, in response to the pop-out menu being activated, the native embedded menu can be concealed, hidden, disabled, etc. The pop-out menu may include all the actions of the embedded menu. The pop-out menu can be moved, dragged, re-positioned, etc., based on inputs by the user. Furthermore, the pop-out menu may be resizable and may contain a list of all selectable actions within the integrated menu.

The pop-out menu may have a modifiable size in contrast to the strict size of the embedded menu (e.g., it can be of a bigger size or a different more accommodating size) which allows all possible menu options to be displayed at once. In addition, the pop-out menu may include a flexible size which an be changed by the user. For example, the user may drag a border, etc., and change a size of the pop-out menu. Furthermore, the pop-out menu may be positioned at a different location on the screen than the original embedded menu allowing for more visual convenience of the user. Therefore, the pop-out menu can have a more optimal size, shape, and location, in comparison to the default size, shape, and location of the embedded menu. Meanwhile, the embedded menu may be disabled, concealed, or otherwise hidden, in response to the pop-out menu being activated. Thus, the primary control of the menu functions can be converted from the integrated menu to the pop-out menu at the time the pop-out menu is activated. In some embodiments, all actions within the embedded menu may be hidden while the pop-out menu is being output. However, in some cases, the currently active/selection action may be displayed within the embedded menu.

The pop-out menu can be placed anywhere on the screen and remains open even when a user has selected an action from the pop-out menu. Furthermore, the actions selected within the pop-out menu cause changes in content/pages to the content area of the original window from which the pop-out menu popped out from.

FIG. 1 illustrates a system architecture of a database 100 in accordance with an example embodiment. It should be appreciated that the embodiments are not limited to architecture 100 or to a database architecture, however, FIG. 1 is shown for purposes of example. The application including the pop-out menu described herein may access data from the database. For example, the database may include or interact with applications which provide user interfaces to visualize underlying data, or the like.

Referring to FIG. 1, the architecture 100 includes a data store 110, a database management system (DBMS) 120, a server 130, services 135, clients 140, and applications 145. Generally, services 135 executing within server 130 receive requests from applications 145 executing on clients 140 and provides results to the applications 145 based on data stored within data store 110. For example, server 130 may execute and provide services 135 to applications 145. Services 135 may comprise server-side executable program code (e.g., compiled code, scripts, etc.) which provide functionality to applications 145 by providing user interfaces to clients 140, receiving requests from applications 145 (e.g., drag-and-drop operations), retrieving data from data store 110 based on the requests, processing the data received from data store 110, and providing the processed data to applications 145.

In one non-limiting example, a client 140 may execute one or more of the applications 145 to perform visual analysis via a user interface displayed on the client 140 to view analytical information such as charts, graphs, tables, and the like, based on the underlying data stored in the data store 110. The applications 145 may pass analytic information to one of services 135 based on input received via the client 140. A structured query language (SQL) query may be generated based on the request and forwarded to DBMS 120. DBMS 120 may execute the SQL query to return a result set based on data of data store 110, and the applications 145 may create a report/visualization based on the result set. In this example, DBMS 120 may perform a query optimization on the SQL query to determine a most optimal alternative query execution plan.

The applications 145 and/or services 135 may be used to identify and combine features for training a machine learning model. Raw data from various sources may be stored in the data store 110. In this example, the applications 145 and/or the services 135 may extract core features from the raw data and also derive features from the core features. The features may be stored as database tables within the data store 110. For example, a feature may be assigned to its own table with one or more columns of data. In one example, the features may be observed as numerical values. Furthermore, the applications 145 and/or the services 135 may merge or otherwise combine features based on a vertical union function. In this example, the applications 145 and/or the services 135 may combine features from a plurality of database tables into a single table which is then stored in the data store 110.

According to various embodiments, one or more of the applications 145 may include a menu embedded therein which can be popped-out of a window thereof. For example, one or more of the applications 145 may enable an embedded navigation menu, or some other type of menu, to be dislodged from an application template, frame, web page, border, tab, panel, etc., of the application 145. Examples of the pop-out menu are further described herein.

The services 135 executing on server 130 may communicate with DBMS 120 using database management interfaces such as, but not limited to, Open Database Connectivity (ODBC) and Java Database Connectivity (JDBC) interfaces. These types of services 135 may use SQL and SQL script to manage and query data stored in data store 110. The DBMS 120 serves requests to query, retrieve, create, modify (update), and/or delete data from database files stored in data store 110, and also performs administrative and management functions. Such functions may include snapshot and backup management, indexing, optimization, garbage collection, and/or any other database functions that are or become known.

Server 130 may be separated from or closely integrated with DBMS 120. A closely-integrated server 130 may enable execution of services 135 completely on the database platform, without the need for an additional server. For example, server 130 may provide a comprehensive set of embedded services which provide end-to-end support for Web-based applications. The services 135 may include a lightweight web server, configurable support for Open Data Protocol, server-side JavaScript execution and access to SQL and SQLScript. Server 130 may provide application services (e.g., via functional libraries) using services 135 that manage and query the database files stored in the data store 110. The application services can be used to expose the database data model, with its tables, views and database procedures, to clients 140. In addition to exposing the data model, server 130 may host system services such as a search service, and the like.

Data store 110 may be any query-responsive data source or sources that are or become known, including but not limited to a SQL relational database management system. Data store 110 may include or otherwise be associated with a relational database, a multi-dimensional database, an Extensible Markup Language (XML) document, or any other data storage system that stores structured and/or unstructured data. The data of data store 110 may be distributed among several relational databases, dimensional databases, and/or other data sources. Embodiments are not limited to any number or types of data sources.

In some embodiments, the data of data store 110 may include files having one or more of conventional tabular data, row-based data, column-based data, object-based data, and the like. According to various aspects, the files may be database tables storing data sets. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another. Furthermore, data store 110 may support multiple users that are associated with the same client and that share access to common database files stored in the data store 110.

According to various embodiments, data items (e.g., data records, data entries, etc.) may be stored, modified, deleted, and the like, within the data store 110. As an example, data items may be created, written, modified, or deleted based on instructions from any of the applications 145, the services 135, and the like. Each data item may be assigned a globally unique identifier (GUID) by an operating system, or other program of the database 100. The GUID is used to uniquely identify that data item from among all other data items stored within the database 100.

The architecture 100 may include metadata defining objects which are mapped to logical entities of data store 110. The metadata may be stored in data store 110 and/or a separate repository (not shown). The metadata may include information regarding dimension names (e.g., country, year, product, etc.), dimension hierarchies (e.g., country, state, city, etc.), measure names (e.g., profit, units, sales, etc.) and any other suitable metadata. According to some embodiments, the metadata includes information associating users, queries, query patterns and visualizations. The information may be collected during operation of system and may be used to determine a visualization to present in response to a received query, and based on the query and the user from whom the query was received.

Each of clients 140 may include one or more devices executing program code of the applications 145 for presenting user interfaces to allow interaction with application server 130. The user interfaces of applications 145 may comprise user interfaces suited for reporting, data analysis, and/or any other functions based on the data of data store 110. Presentation of a user interface may include any degree or type of rendering, depending on the type of user interface code generated by server 130. For example, a client 140 may execute a Web Browser to request and receive a Web page (e.g., in HTML format) from application server 130 via HTTP, HTTPS, and/or Web Socket, and may render and present the Web page according to known protocols.

One or more of clients 140 may also or alternatively present user interfaces by executing a standalone executable file (e.g., an .exe file) or code (e.g., a JAVA applet) within a virtual machine. Clients 140 may execute applications 145 which perform merge operations of underlying data files stored in data store 110. Furthermore, clients 140 may execute the conflict resolution methods and processes described herein to resolve data conflicts between different versions of a data file stored in the data store 110. A user interface may be used to display underlying data records, and the like.

Figure 2A:
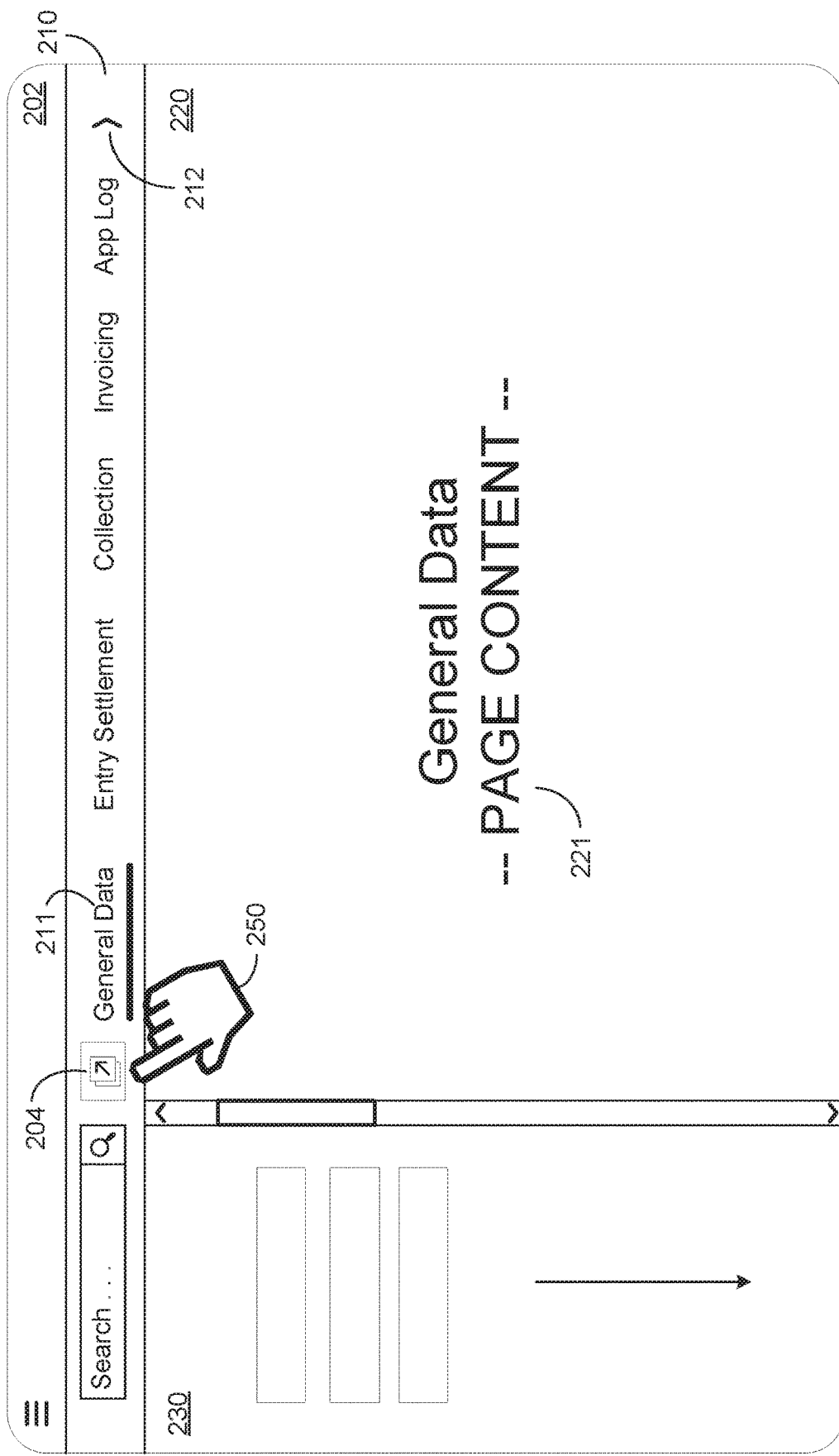

FIGS. 2A-2F illustrate processes of controlling a pop-out menu that has been popped out of a user interface in accordance with example embodiments. FIG. 2A illustrates an example of a process 200A of a user selecting a pop-out button 204 of an embedded menu 210. Referring to FIG. 2A, a menu 210 is embedded within a frame of a user interface window 202. Here, the menu 210 may be embedded within an application template, etc. The embedded menu 210 includes a plurality of selectable actions 211 for navigating to different pages of content within the application. In the example of FIG. 2A, a "general data" action is currently selected. In this example, a common problem with the menu 210 is shown. In this case, not all selectable actions 211 can be shown within the bar of the menu 210. Therefore, a scroll arrow 212 is added to the embedded menu 210 to enable the user to scroll over and see additional selectable actions 211.

The user interface window 202 further includes a content area 220 which shows page content 221 of the selected action (General Data). The content area 220 may be referred to as a navigation area, page area, or the like. It should also be appreciated that the user interface window 202 may include other areas and visual elements such as a secondary content area 230 for inputting data fields of value, etc.

In the example of FIG. 2A, an icon 204 is shown within the embedded menu 210. The icon 204 corresponds to a pop-out menu. Here, a user may use a cursor 250 to select the icon 204. In doing so, the embedded menu 210 can be popped-out of the user interface window 202 as shown in a process 200B of FIG. 2B.

Figure 2B:
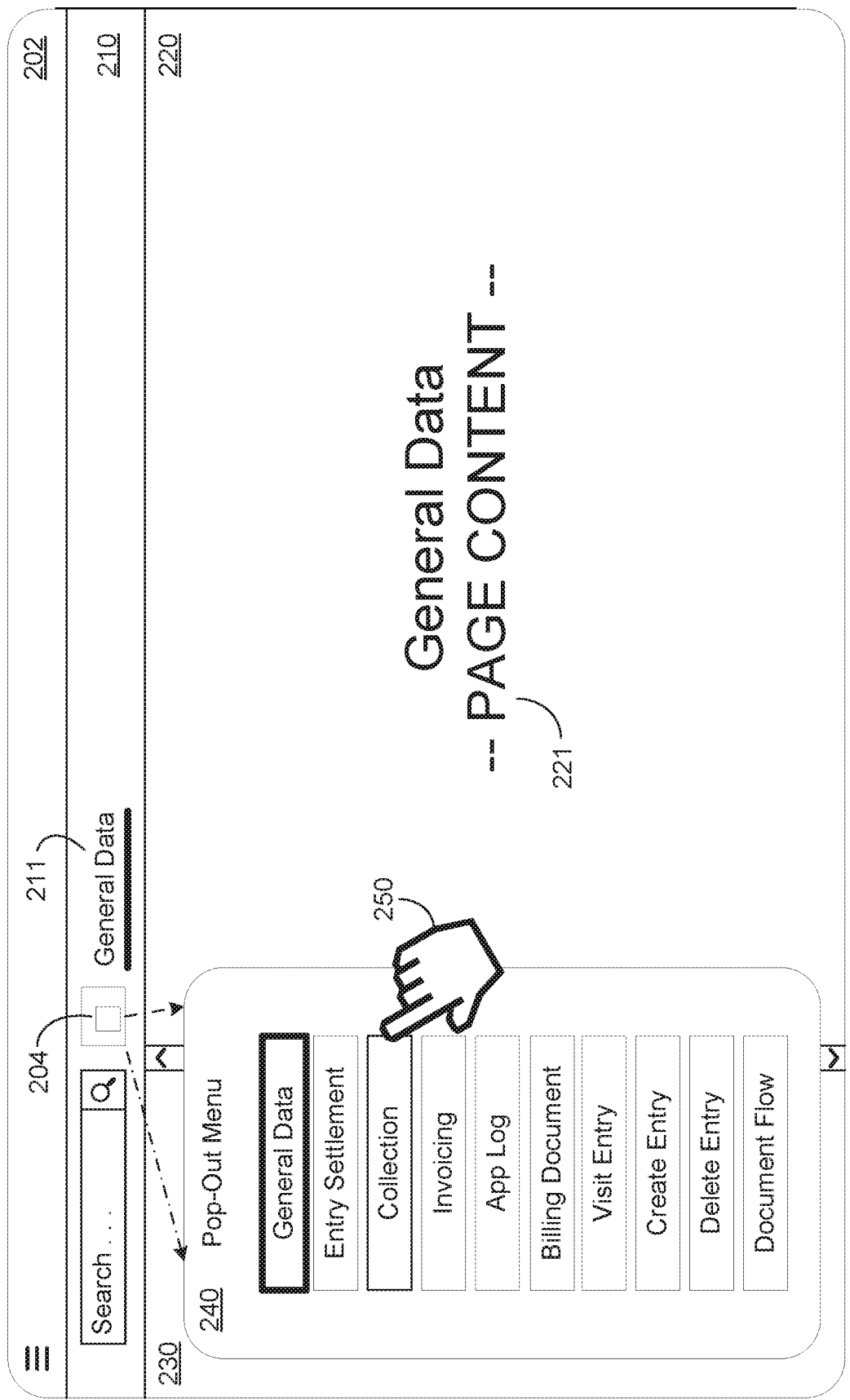

Referring to FIG. 2B, a pop-out menu 240 is shown which corresponds to the original embedded menu 210. Here, the pop-out menu 240 includes a plurality of selectable actions that correspond to the selectable actions of the original embedded menu 210. However, the pop-out menu 240 may include a different size and shape of the embedded menu 210. Therefore, it is possible for all of the selectable actions to be shown within the pop-out menu 240. Furthermore, as a result of the pop-out menu 240 being activated/popped out of its embedded position within the application, the application may change the appearance of the icon 204 to represent that the pop-out menu is active (e.g., that it has left its dock.) Furthermore, in response to the pop-out menu 240 being activated, the embedded menu 210 may be hidden from view, except for the currently selected menu action 211 which corresponds to the general data content.

Referring to FIG. 2C, after outputting the pop-out menu 240, the user may make selections from actions within the pop-out menu 240 using the cursor 250. Here, the user may select a selectable action 241 from the pop-out menu. In this case, selectable action 241 from the pop-out menu 240 corresponds to selectable action 213 from the embedded menu 210. In response, the selection via the pop-out menu 240 triggers a content change in the content area 220 embedded within the application's user interface window 202. In particular, a "Collection" action is selected, and Collection content 222 is displayed in the content area 220.

Referring to FIG. 2B and FIG. 2C, the application may conceal content of the embedded menu 210. In some embodiments, all of the content of the embedded menu 210 may be concealed. As another example, the currently selected action (e.g., action 213) may remain displayed within the embedded menu 210. The concealing may include hiding, obscuring, or otherwise removing content from the embedded menu 210. The application may also disable this selectable area of the embedded menu 210 on the user interface 202 from being used to make selections. Thus, the primary control of the application functionality is shifted to the pop-out menu 240. In some embodiments, the selected action 213 may be moved to the end (right-side) of the embedded menu bar 210. Here, the selected action 213 may be visible/readable only, and not capable of being selected or changed via the embedded menu 210.

The pop-out menu 240 may include a pop-up window, module, panel, tab, etc., having its own borders allowing for the pop-out menu 240 to be visually differentiated from the user interface window 202. Furthermore, the pop-out menu 240 may hide screen content underneath the pop-out menu 240 making the pop-out menu 240 and its content more visible.

FIG. 2D illustrates a process 200D of a user inputting commands which cause the pop-out menu 240 to move on the screen. Referring to FIG. 2D, the user input may include a touch, mouse point, etc., which is inside an interior area of the pop-out menu 240 and which causes the menu move cursor 244 to be displayed. Here, the user may use cursor 250 to create a drag input 252 causing the pop-out menu 240 on the screen to move while the move cursor 244 being displayed. The user can move/drag the pop-out menu 240 in all directions. Furthermore, movement of the pop-out menu 240 may be independent of the user interface window 202 from which the pop-out menu 240 has popped out of. For example, when the user moves the pop-out menu 240 using the drag input 252, the user interface window 202 may remain in place on the screen.

FIG. 2E illustrates a process 200E of a user changing a size of the pop-out menu 240 based on a drag border input 254. In the example of FIG. 2E, the user manipulates the cursor 250 to select and move an outer border 246 of the pop-out menu 240. Here, the drag border input 254 may enlarge or reduce an area of the pop-out menu by moving the outer border 246. As another example, or in addition (simultaneously), the drag border input 254 may change a shape of the pop-out menu 240. If the input controls the outer border 246 to reduce the size/shape of the pop-out menu 240 such that not all selectable actions are visible within the pop-out menu 240, the pop-out menu 240 may initialize a scroll bar to allow the user to scroll to the hidden selectable actions within the pop-out menu 240.

Figure 2F:
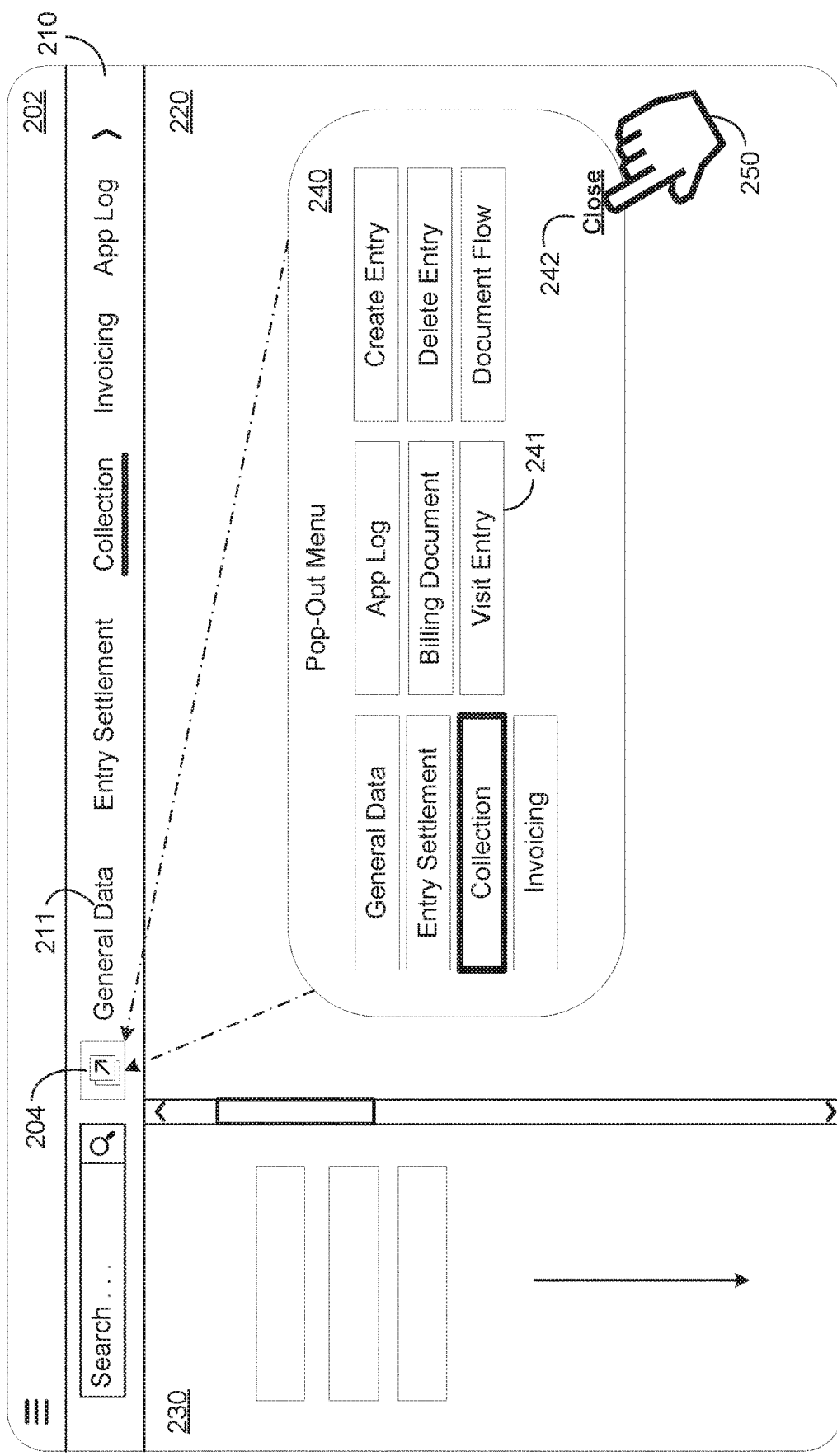

FIG. 2F illustrates a process 200F of returning the pop-out menu 240 back to the embedded menu 210. In other words, the process 200F includes the pop-out menu 240 being docked into its original location. Referring to FIG. 2F, a user may select a close button 242 within the pop-out menu 240 which closes the pop-out menu 240 (removes it from the screen) and returns the embedded menu 210 back to its original location (similar to FIG. 2A). In this example, the icon 204 may change to indicate that the pop-out menu 240 has been placed back into the embedded menu 210 (i.e., it has been docked).

Figure 3B:
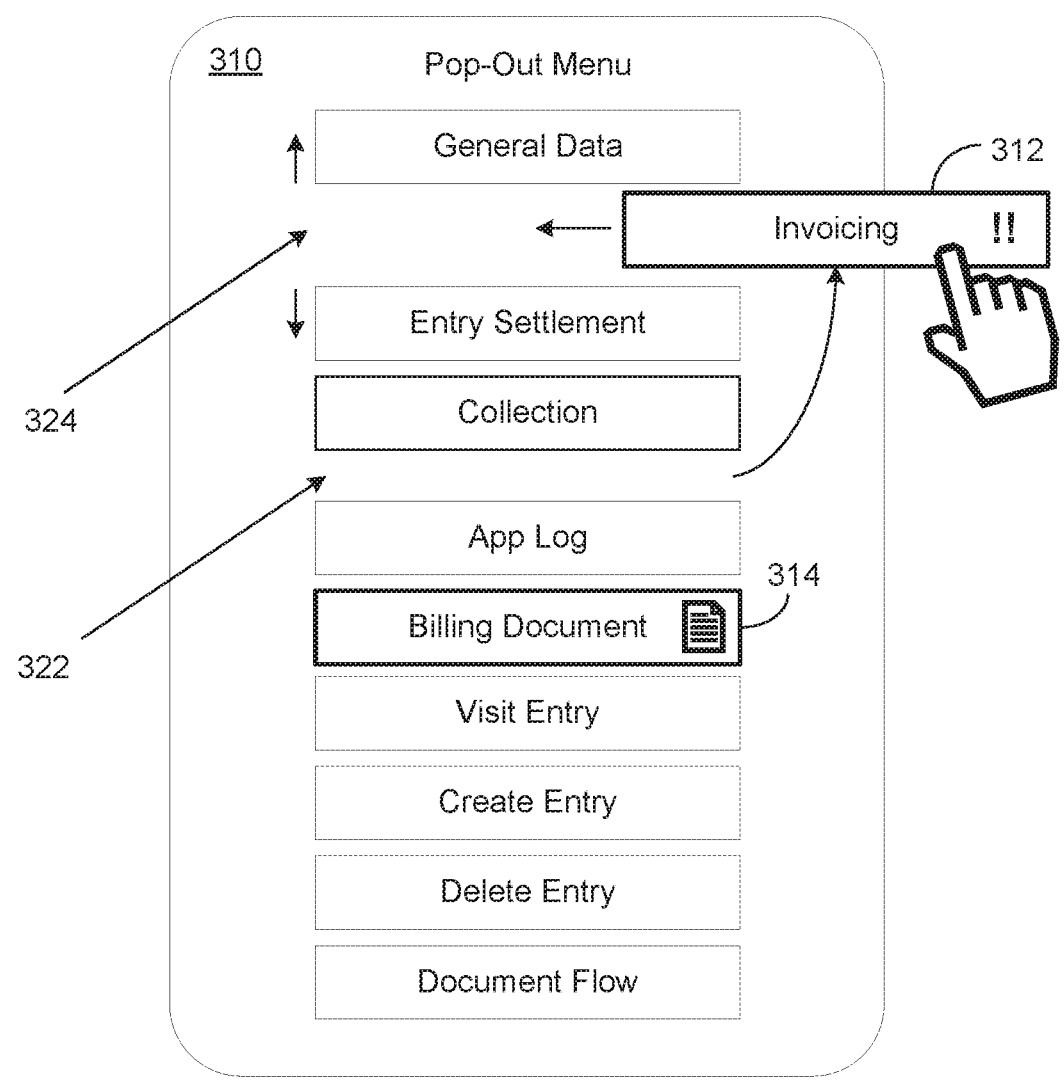
FIG. 3B is a diagram illustrating a process of rearranging an order of menu actions in a pop-out menu in accordance with an example embodiment.

FIG. 3A illustrates a process 300A of communicating with a pop-out menu 310 in accordance with an example embodiment, and FIG. 3B illustrates a process 300B of rearranging an order of menu actions in the pop-out menu 310 in accordance with an example embodiment. Referring to FIG. 3A, the pop-out menu 310 pops out of a user interface window 302. Here, the user interface window 302 may communicate with the pop-out menu 310 to provide notifications, events, commands, and the like.

According to various embodiments, based on content being displayed within a content area of the user interface window 302, notifications may be transmitted from the user interface window 302 to the pop-out menu 310. For example, the notification may indicate that a user has not finished filling in all invoices for a period of time. In response, the pop-out menu 310 may display a warning icon (exclamation point, etc.) within a menu action 312 corresponding to invoicing. As another example, the user interface window 302 may receive a new billing document and inform the pop-out menu 310. In response, the pop-out menu 310 may display a new document indicator within a menu action 314 associated with billing document.

Referring now to FIG. 3B, a user may manipulate the selectable actions within the pop-out menu 310 to change or otherwise rearrange an order of the selectable actions. In this example, the user drags selectable action 312 out of its initial default location 322 and inserts it into a new location 324 in between a General Data action and an Entry Settlement action of the pop-out menu 310. Here, the selectable menu actions may automatically move up and down to accommodate the movement of the selectable action 312.

Figure 4:
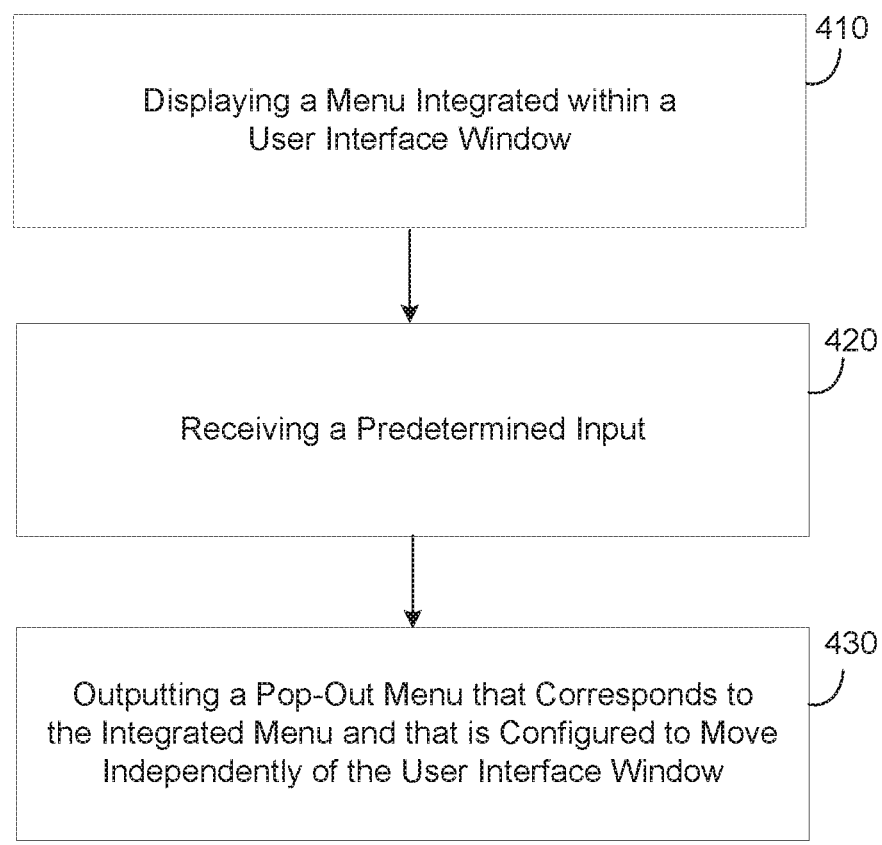
FIG. 4 is a diagram illustrating a method of popping out an embedded menu in accordance with an example embodiment.

FIG. 4 illustrates a method 400 of popping out an embedded menu in accordance with an example embodiment. For example, the method 400 may be performed by a software program running on a database node, a cloud platform, a server, a computing system (user device), a combination of devices/nodes, or the like.

In 410, the method may include displaying a menu comprising a plurality of selectable actions which are embedded within a user interface window. For example, the menu may be a menu that is integrated into an application template or user interface window. The menu may include a plurality of actions (e.g., selectable options, menu items, etc.) which, when selected, can navigate to a different page of the application (or website), load different content, etc. The menu may include other areas not specifically described herein. In some embodiments, the receiving the predetermined command may include detecting selection of an input button, and in response, changing an identifier of the input button to indicate that the pop-out menu is activated.

In 420, the method may include receiving a predetermined input with respect to the user interface. For example, the input may be a selection of a pop-out icon or some other user interface element which triggers the pop-out menu. In response to receipt of the predetermined command, in 430 the method may include outputting a pop-out menu that corresponds to the menu embedded within the user interface window. According to various embodiments, the pop-out window may include the plurality of selectable actions of the embedded menu and may be configured to move independently of the user interface window.

In some embodiments, the outputting may include popping-out the menu embedded within the user interface window to create the pop-out menu, and simultaneously concealing the menu embedded within the user interface window. In some embodiments, the method may further include converting the pop-out menu back into the menu embedded within the user interface window in response to detection of a close command via the pop-out menu.

In some embodiments, the method may further include detecting a move input of the pop-out menu, and in response, moving the pop-out menu independently of the user interface window based on the drag input. In some embodiments, the method may further include detecting a drag input of an outer border of the pop-out menu, and in response, changing a visual area of the pop-out menu based on the move input. In some embodiments, the method may further include detecting a selection of a selectable action within the pop-out menu, and in response, navigating to a page of content corresponding to the selectable action within a content area of the user interface window. In some embodiments, the method may include re-arranging an order of the selectable actions within the pop-out menu in response to a drag-and-drop input of a selectable action with respect to other selectable actions within the pop-out menu. In some embodiments, the method may include displaying a notification within one or more selectable actions of the pop-out menu based on a communication from the user interface window.

Figure 5:
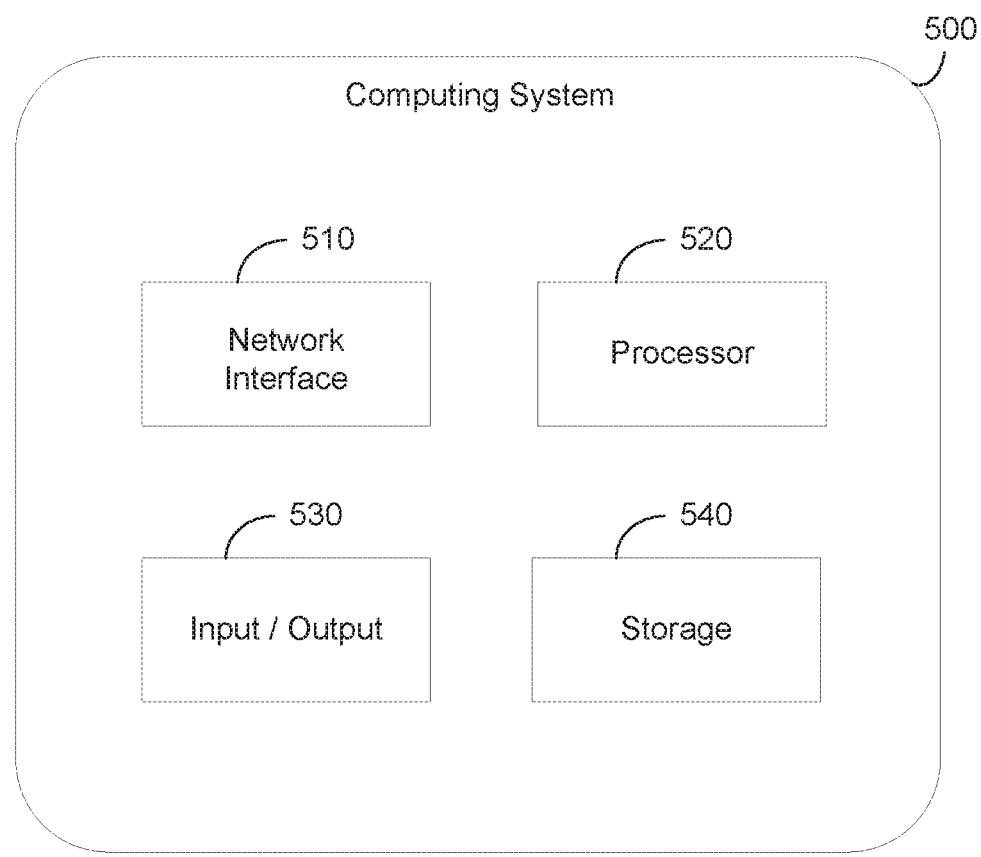
FIG. 5 is a diagram illustrating a computing system for use in the examples herein in accordance with an example embodiment.

FIG. 5 illustrates a computing system 500 that may be used in any of the methods and processes described herein, in accordance with an example embodiment. For example, the computing system 500 may be a database node, a server, a cloud platform, or the like. In some embodiments, the computing system 500 may be distributed across multiple computing devices such as multiple database nodes. Referring to FIG. 5, the computing system 500 includes a network interface 510, a processor 520, an input/output 530, and a storage device 540 such as an in-memory storage, and the like. Although not shown in FIG. 5, the computing system 500 may also include or be electronically connected to other components such as a microphone, a display, an input unit(s), a receiver, a transmitter, a persistent disk, and the like. The processor 520 may control the other components of the computing system 500.

The network interface 510 may transmit and receive data over a network such as the Internet, a private network, a public network, an enterprise network, and the like. The network interface 510 may be a wireless interface, a wired interface, or a combination thereof. The processor 520 may include one or more processing devices each including one or more processing cores. In some examples, the processor 520 is a multicore processor or a plurality of multicore processors. Also, the processor 520 may be fixed or it may be reconfigurable. The input/output 530 may include an interface, a port, a cable, a bus, a board, a wire, and the like, for inputting and outputting data to and from the computing system 500. For example, data may be output to an embedded display of the computing system 500, an externally connected display, a display connected to the cloud, another device, and the like. The network interface 510, the input/output 530, the storage 540, or a combination thereof, may interact with applications executing on other devices.

The storage device 540 is not limited to a particular storage device and may include any known memory device such as RAM, ROM, hard disk, and the like, and may or may not be included within a database system, a cloud environment, a web server, or the like. The storage 540 may store software modules or other non-transitory instructions which can be executed by the processor 520 to perform the methods and processes described herein. The storage 540 may include a data store having a plurality of tables, partitions and sub-partitions. The storage 540 may be used to store database records, items, entries, and the like. Also, the storage 540 may be queried using SQL commands.

According to various embodiments, the output 530 (or the processor 520) may output a menu that comprises a plurality of selectable actions which are integrated within a user interface window. For example, the output 530 may display the menu and the user interface window of an application on a screen of a display device. Here, the display device may be connected (externally, internally, etc.) to the computing system 500. As another example, the display device may be a different device that is connected to the computing system 530 via a network and communicating with the network interface 510.

The processor 520 may detect or otherwise receive a predetermined command with respect to the user interface window, and in response to receipt of the predetermined command, output a pop-out menu that corresponds to the menu integrated within the user interface window. For example, the pop-out menu may include the same plurality of selectable actions as the integrated menu and may be configured to move independently of the user interface window from which it pops out of.

In some embodiments, the processor 520 may pop-out the menu that is integrated or otherwise embedded within the user interface window to create the pop-out menu, and simultaneously conceal the menu integrated within the user interface window. In some embodiments, the processor 520 may further convert the pop-out menu back into the menu integrated within the user interface window in response to detection of a close command via the pop-out menu.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
    an output configured to display a user interface window that includes an embedded menu bar that comprises a plurality of selectable actions displayed therein which when selected open a plurality of navigation pages via an embedded navigation window, respectively, the plurality of selectable actions being arranged horizontally with respect to each other within the embedded menu bar; and
    a processor configured to receive a predetermined command with respect to the user interface window, and in response to receipt of the predetermined command, pop-out the embedded menu bar to initialize a pop-out menu bar that corresponds to the embedded menu bar within the user interface window and simultaneously conceal names of unselected selectable actions within the embedded menu bar within the user interface window,
    wherein the pop-out menu bar initially comprises a larger size than the embedded menu bar, includes more selectable actions than are displayed in the embedded menu bar, includes each of the plurality of selectable actions popped out from the embedded menu bar and the one or more hidden selectable actions completely hidden within the embedded menu bar which are arranged vertically with respect to each other, and is configured to move independently of the user interface window.

2. The computing system of claim 1, wherein the processor is further configured to convert the pop-out menu bar back into the embedded menu bar within the user interface window in response to detection of a close command via the pop-out menu bar.

3. The computing system of claim 1, wherein the processor is further configured to detect a selection of an input button, and in response, pop out the pop-out menu bar and change an identifier of the input button to indicate that the pop-out menu bar is activated.

4. The computing system of claim 1, wherein the processor is further configured to detect a move input of the pop-out menu bar, and in response, move the pop-out menu bar independently of the user interface window based on the move input.

5. The computing system of claim 1, wherein the processor is further configured to detect a drag input of an outer border of the pop-out menu bar, and in response, change a visual area of the pop-out menu bar based on the drag input.

6. The computing system of claim 1, wherein the processor is further configured to detect a selection of a popped-out selectable action within the pop-out menu bar, and in response, navigate to a page of content corresponding to the selectable action within the embedded navigation window of the user interface window.

7. The computing system of claim 1, wherein the processor is further configured to rearrange an order of the plurality of popped-out selectable actions within the pop-out menu bar in response to detection of a drag-and-drop input of a popped-out selectable action with respect to other popped-out selectable actions within the pop-out menu bar.

8. The computing system of claim 1, wherein the processor is further configured to display a notification within one or more popped-out selectable actions of the pop-out menu bar based on a communication from the user interface window.

9. The computing system of claim 1, wherein the pop-out menu bar initially includes a larger vertical width than the embedded menu bar.

10. The computing system of claim 1, wherein the embedded menu bar comprises all of the plurality of selectable actions from the embedded menu bar arranged in a horizontal list and the one or more hidden selectable actions at a bottom of the horizontal list, and the processor is configured to display the popped-out plurality of selectable actions in a vertical list within the pop-out menu bar.

11. The computing system of claim 1, wherein the processor is configured to detect a selection on a clickable button that is independent of the plurality of selectable actions and which is embedded within the user interface window, and in response to detection of the selection on the clickable button, initialize the display of the pop-out menu bar within the user interface window at a different location than a location of the embedded menu bar.

12. A method comprising:
displaying a user interface window that includes an embedded menu bar comprising a plurality of selectable actions displayed therein which when selected open a plurality of navigation pages via an embedded navigation window, respectively, the plurality of selectable actions being arranged horizontally with respect to each other within the embedded menu bar;
receiving a predetermined input with respect to the user interface window; and
in response to receipt of the predetermined command, pop-out the embedded menu bar to initialize a pop-out menu bar that corresponds to the embedded menu bar within the user interface window and simultaneously conceal names of unselected selectable actions within the embedded menu bar within the user interface window,
wherein the pop-out menu bar initially comprises a larger size than the embedded menu bar, includes more selectable actions than are displayed in the embedded menu bar, includes each of the plurality of selectable actions popped out from the embedded menu bar and the one or more hidden selectable actions completely hidden within the embedded menu bar which are arranged vertically with respect to each other, and is configured to move independently of the user interface window.

13. The method of claim 12, further comprising converting the pop-out menu bar back into the embedded menu bar within the user interface window in response to detection of a close command via the pop-out menu bar.

14. The method of claim 12, wherein the receiving the predetermined command comprises detecting selection of an input button, and in response, popping out the pop-out menu bar and changing an identifier of the input button to indicate that the pop-out menu bar is activated.

15. The method of claim 12, further comprising detecting a move input of the pop-out menu bar, and in response, moving the pop-out menu bar independently of the user interface window based on the move input.

16. The method of claim 12, further comprising detecting a drag input of an outer border of the pop-out menu bar, and in response, changing a visual area of the pop-out menu bar based on the drag input.

17. The method of claim 12, wherein the method further comprising detecting a selection of a popped-out selectable action within the pop-out menu bar, and in response, navigating to a page of content corresponding to the selectable action within the embedded navigation window of the user interface window.

18. The method of claim 12, further comprising re-arranging an order of the plurality of popped-out selectable actions within the pop-out menu bar in response to a drag-and-drop input of a popped-out selectable action with respect to other popped-out selectable actions within the pop-out menu.

19. The method of claim 12, further comprising displaying a notification within one or more popped-out selectable actions of the pop-out menu bar based on a communication from the user interface window.

20. A non-transitory computer-readable medium comprising instructions which when executed by a processor cause a computer to perform a method comprising:
displaying a user interface window that includes an embedded menu bar comprising a plurality of selectable actions displayed therein which when selected open a plurality of navigation pages via a navigation window, respectively, the plurality of selectable actions being arranged horizontally with respect to each other within the embedded menu bar;
receiving a predetermined command with respect to the user interface window; and
in response to receipt of the predetermined command, pop-out the embedded menu bar to initialize a pop-out menu bar that corresponds to the embedded menu bar within the user interface window and simultaneously conceal names of unselected selectable actions within the embedded menu bar within the user interface window, wherein the pop-out menu bar initially comprises a larger size than the embedded menu bar, includes more selectable actions than are displayed in the embedded menu bar, includes each of the plurality of selectable actions popped out from the embedded menu bar and the one or more hidden selectable actions completely hidden within the embedded menu bar which are arranged vertically with respect to each other, and is configured to move independently of the user interface window.

* * * * *